United States Patent [19]
Blomgren et al.

[11] Patent Number: 5,542,109
[45] Date of Patent: Jul. 30, 1996

[54] ADDRESS TRACKING AND BRANCH RESOLUTION IN A PROCESSOR WITH MULTIPLE EXECUTION PIPELINES AND INSTRUCTION STREAM DISCONTINUITIES

[75] Inventors: James S. Blomgren, San Jose; Earl T. Cohen, Fremont, both of Calif.

[73] Assignee: Exponential Technology, Inc., San Jose, Calif.

[21] Appl. No.: 298,771

[22] Filed: Aug. 31, 1994

[51] Int. Cl.⁶ ............................................. G06F 9/38
[52] U.S. Cl. .................... 395/800; 395/375; 364/231.8; 364/948.34
[58] Field of Search ..................... 395/800, 375, 395/425; 364/DIG. 1, DIG. 2, 748

[56] References Cited

U.S. PATENT DOCUMENTS

| | | | |
|---|---|---|---|
| 4,802,113 | 1/1989 | Onishi et al. | 364/DIG. 1 |
| 4,833,599 | 5/1989 | Colwell et al. | 364/200 |
| 4,853,840 | 8/1989 | Shibuya | 364/DIG. 1 |
| 4,916,652 | 4/1990 | Schwarz et al. | 364/748 |
| 5,088,030 | 2/1992 | Yoshida | 364/275 |
| 5,099,419 | 3/1992 | Nomura | 395/375 |
| 5,150,469 | 9/1992 | Jouppai | 395/375 |
| 5,193,156 | 3/1993 | Yoshida et al. | 395/375 |
| 5,206,945 | 4/1993 | Nishimakai et al. | 395/425 |
| 5,228,131 | 7/1993 | Ueda et al. | 395/375 |
| 5,287,467 | 2/1994 | Blaner et al. | 395/375 |
| 5,307,492 | 4/1994 | Benson | 395/700 |
| 5,307,504 | 4/1994 | Robinson et al. | 395/800 |
| 5,327,547 | 7/1994 | Stiles et al. | 395/425 |
| 5,454,090 | 9/1995 | Fleck et al. | 395/375 |

Primary Examiner—Alyssa H. Bowler
Assistant Examiner—Walter D. Davis, Jr.
Attorney, Agent, or Firm—Stuart T. Auvinen

[57] ABSTRACT

An address of any desired instruction in a super-scalar processor is generated using address tracking logic. A sequential address register in the last stage of the processor's pipelines holds the address of the last or oldest instruction in the pipelines. This register is updated with a target address when a branch instruction is actually taken. A pipeline valid array contains valid bits for the instructions in the pipelines, and also contains the lengths of the instructions for complex instruction sets having instructions that vary in length. The address of the desired instruction is calculated as the sum of a base address and an adjustment value. The base address is the address of the last instruction which is stored in the sequential address register when there are no intervening taken branches between the desired instruction and the last instruction in the pipelines. When there is an intervening taken branch, the target address from the taken branch closest to the desired instruction is selected as the base address. The adjustment value is the sum of all the instruction lengths for instructions between the desired instruction and the last instruction, or the closest intervening taken branch if it exists. A branch resolver uses this address tracking logic to generate the address of a branch instruction being resolved, and the address of the following sequential instruction. A recovery address for branch mis-prediction sent to the instruction fetcher is the following sequential address when the branch is actually not taken, and is the target address when the branch is actually taken. The branch can be resolved in any pipeline stage.

10 Claims, 6 Drawing Sheets

ADDRESS TRACKING AND BRANCH RESOLUTION IN A PROCESSOR WITH MULTIPLE EXECUTION PIPELINES AND INSTRUCTION STREAM DISCONTINUITIES

BACKGROUND OF THE INVENTION - RELATED APPLICATION

This application is related to copending application for a "Dual-Instruction-Set Architecture CPU with Hidden Software Emulation Mode", filed Jan. 1, 1994, U.S. Ser. No. 08/179,926, hereby incorporated by reference. This application is also related to copending application for a "Pipeline with Temporal Re-Arrangement of Functional Units for Dual-Instruction-Set CPU", filed Jan. 11, 1994, U.S. Ser. No. 08/180,023, hereby incorporated by reference. This application is further related to copending application for "Dual-Architecture Exception and Branch Prediction using a Fault-Tolerant Target Finder Array", filed Aug. 31, 1994, U.S. Ser. No. 08/298,778, hereby incorporated by reference. These related applications have a common inventor and are assigned to the same assignee as the present application.

BACKGROUND OF THE INVENTION - FIELD OF THE INVENTION

This invention relates to computers and processors, and more particularly to tracking the address of instructions being processed by a super-scalar processor with multiple pipelines.

BACKGROUND OF THE INVENTION - DESCRIPTION OF THE RELATED ART

Current central processing units (CPU's) employ pipelines allowing several instructions to be processed simultaneously. Each stage of a pipeline performs a function in executing or processing an instruction. Instructions generally enter the pipeline and complete the pipeline one at a time, since each stage can hold just one instruction.

Super-scalar CPU's have more than one pipeline. Thus, a CPU with two pipelines can have two instructions enter and complete the pipelines at a time. The maximum throughput of instructions is effectively doubled. However, having multiple pipelines increases the complexity of the control logic.

One area where complexity is notably increased is when branches are processed. A branch instruction may interrupt the sequential fetching and processing of instructions if the branch is taken. Sequential fetching and processing must stop at the end of the branch instruction and continue at the target of the branch instruction. The instruction at the target is fetched and processed, and sequential fetching and processing continues with the target. Often the instructions sequentially after a branch are being processed when the outcome of the branch is finally determined. These instructions must be purged from the pipelines.

Exceptions are also a notable problem. Any instruction can have an exception, which will cause the processor to stop sequential processing and instead process an exception handling routine. All the instructions following the instruction having the exception must be purged from the pipelines. While branches may be predicted, exceptions usually cannot be predicted.

Thus any instruction in the pipeline can cause a discontinuity in an otherwise sequential instruction stream. Processing these discontinuities often requires that the address of the instructions before or after the discontinuity be known. For example, the address of the instruction causing an exception, or the following sequential instruction, is typically stored in a register so that processing can resume once the exception handling routine is completed. Taken branch instructions cause the target address to be loaded into a program or instruction counter. Branch prediction may require both the address of the branch instruction and the address of the target instruction when a mis-prediction has occurred, so that the prediction information may be updated.

One particular problem to be solved in the design of super-scalar CPU's is keeping track of the addresses of the instructions being processed. In a prior art system, such as shown in FIG. 1, the address of each instruction in each pipeline 10, 12, 14 is stored in banks of staging registers 10R, 12R, 14R. As each instruction is sent down the pipeline, its address is likewise sent down the pipeline. Thus an instruction address register is needed for every stage of every pipeline. In a super-scalar processor having three pipelines, with each pipeline having five stages, a total of 3×5 or 15 instruction registers are needed. As instruction addresses are typically 32-bits in size, a total of 15×32 or 480 bits of address registers are needed if all instructions in all the pipelines are provided with address registers. Adding more pipelines increases the number of registers required. Because of this cost, most super-scalar CPU's restrict the branch to be the last instruction in a group of instructions sent down the pipelines together.

Generating the addresses of each instruction at the beginning of the pipelines may also be difficult, since the addresses of the instructions may not be kept by the instruction buffer or fetcher.

What is therefore desired is a method and apparatus to determine the address of any instruction in any of the pipelines. It is desirable to generate these addresses without having address registers for each instruction in each of the pipelines. A low-cost method is desired to track the addresses in a processor with multiple pipelines. Increasing the number of pipelines should not significantly increase the cost of the address tracking. Thus the address tracker is ideal for future processors that will have many additional pipelines.

It is also desired to have a processor that allows an instruction stream discontinuity to occur anywhere within the pipelines. It is desired to reduce or eliminate pipeline stalls for branch resolution. It is highly desirable to track instruction addresses and process instructions from more than one instruction set.

SUMMARY OF THE INVENTION

An address of any desired instruction in a super-scalar processor is generated using address tracking logic. A sequential address register in the last stage of the processor's pipelines holds the address of the last or oldest instruction in the pipelines. This register is updated with a target address when a branch instruction is actually taken.

A processor comprises a pipeline for executing a branch instruction. The pipeline includes target means for generating a target address for the branch instruction and staging means for staging this target address through the pipeline. Exit register means receives the target address when the branch instruction is a taken branch, and stores an exit address of a next instruction to complete processing by the processor. The exit address is updated with the target address when the branch instruction is a taken branch.

An incrementer means receives the exit address of the next instruction to complete processing by the processor and increments the exit address by an adjustment value. The adjustment value is a sum of instruction lengths of a group of instructions completing processing by the processor since the exit register means was last updated. Update means updates the exit address with the sum of the exit address and the adjustment value. The update means updates the exit address when the branch instruction is not a taken branch, or when the group of instructions completing processing is absent any branch instruction. Thus the exit address is an address of the next instruction to complete processing by the processor.

In further aspects of the invention the processor includes a plurality of pipelines. An address tracking means generates a desired address of a desired instruction in the plurality of pipelines; the address tracking means receiving the exit address from the exit register means and the target address from the staging means. Valid bits indicate locations and the order of valid instructions in the plurality of pipelines. A search means determines if an intervening taken branch instruction is present in the plurality of pipelines after the desired instruction but before the next instruction to complete processing by the processor.

A base select means selects as a base address a target address for the intervening taken branch instruction if the intervening taken branch instruction is determined to be present by the search means, but selects as the base address the exit address if the intervening taken branch instruction is determined not to be present by the search means. An adjust means generates an adjustment from the valid bits. The adjustment is a total of a first plurality of instruction lengths for instructions in the plurality of pipelines between the desired instruction and the intervening taken branch instruction if the intervening taken branch instruction is determined to be present. However, the adjustment is a total of a second plurality of instruction lengths for instructions in the plurality of pipelines between the desired instruction and the next instruction to complete processing by the processor if the intervening taken branch instruction is determined not to be present. An adder means adds the adjustment to the base address to generate an address of the desired instruction.

The desired instruction may be an instruction causing an exception, a second branch instruction, or an instruction following a second branch instruction.

In still further aspects of the invention, a second address tracking means outputs an address of a following sequential instruction following the second branch instruction. A recovery address multiplexing means outputs a recovery address when a mis-prediction is signaled. The recovery address is the address of the following sequential instruction when the second branch instruction has an actual outcome of not taken, but the recovery address is a second target address for the second branch instruction when the second branch instruction has an actual outcome of taken. The recovery address is sent to an instruction fetch unit.

A branch resolver determines if the second branch instruction has the actual outcome of taken or not taken. The branch resolver compares the actual outcome to a predicted outcome and signals the mis-prediction if the actual outcome does not match the predicted outcome.

In other aspects, the invention receives a plurality of target addresses from a plurality of pipeline stages, so that the second branch instruction may be resolved in any pipeline stage.

DETAILED DESCRIPTION

Figure 1:
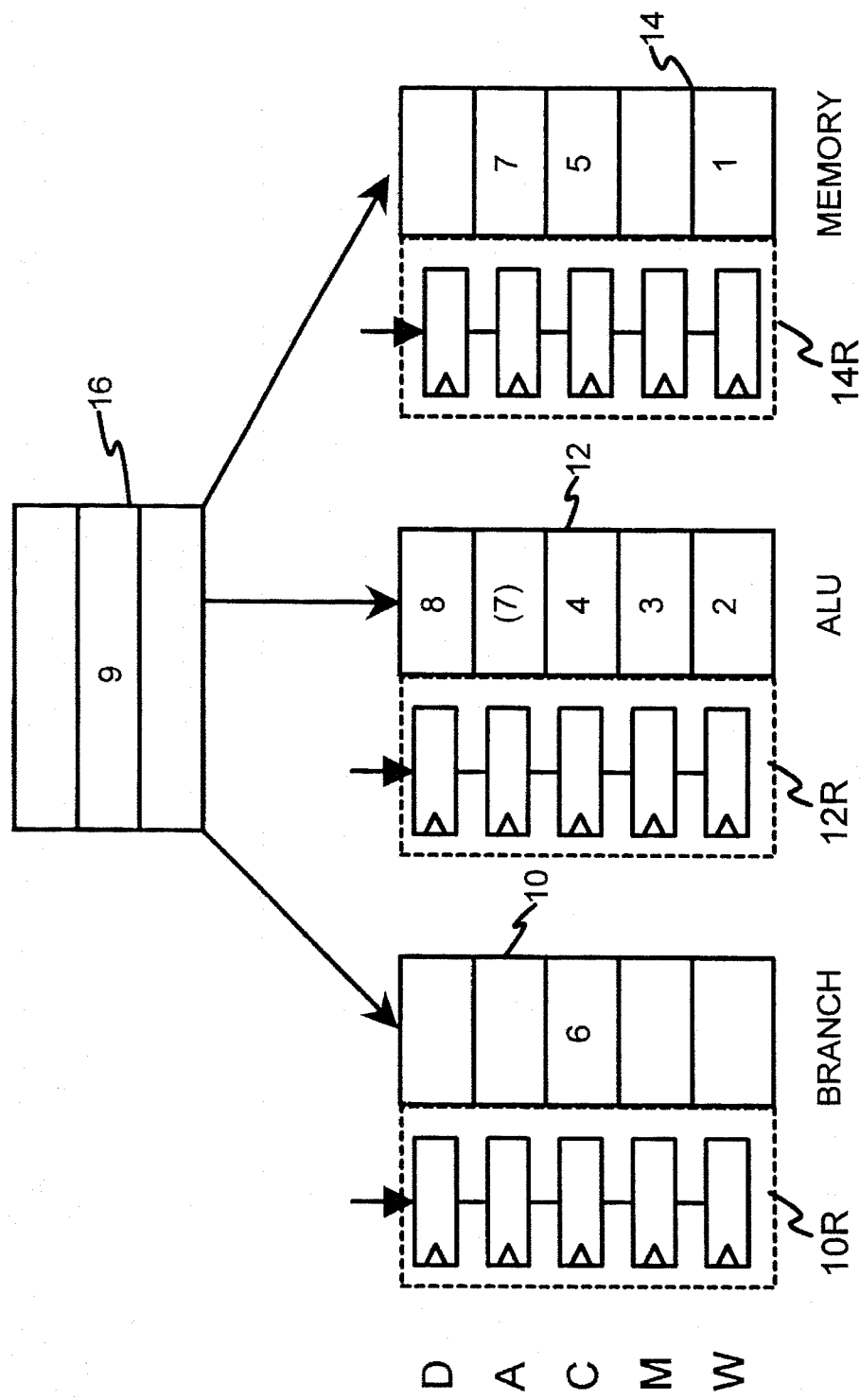
FIG. 1 is a diagram of the prior art.

The present invention relates to an improvement in processors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

BASIC PIPELINE FLOW

The diagram below indicates the progression of each instruction through one of the pipelines, with time increasing to the right by one clock for every stage, while subsequent instructions are listed below one another. Stages are abbreviated as D, A, C, M, and W, for decode, address generate, cache, memory, and write-back.

| Time (clocks):   | 1 | 2 | 3 | 4 | 5 | 6 |
|---|---|---|---|---|---|---|
| 1st Instruction: | D | A | C | M | W |   |
| 2nd Instruction: |   | D | A | C | M | W |
| 3rd Instruction: |   |   | D | A | C | M | W |

Thus the pipeline is:

DECODE ADDR GEN CACHE MEMORY WRITE-BACK

Instructions are first fetched by a fetch stage that is not shown. The decode stage decodes the instruction and dispatches it to the correct pipeline(s). An address of an operand is generated in the address generate stage, and a 2-clock cycle operand fetch is performed in the cache and memory stages. Alternately, a one-cycle operand fetch may be performed in the cache stage, and the memory stage may be a "Match" stage wherein the cache tag or TLB tag is compared to see if a match occurred and the operand fetched in the cache stage is valid. A write-back stage is normally included at the end of the pipeline when the results are written back into the register file and the condition codes are modified. Execution of an arithmetic-logic-unit (ALU) operation can be performed in any of the A, C, or M stages because the execution unit may be moved to any of these stages.

The diagram above shows a typical pipeline used for illustrative purposes. The invention is not restricted to just this particular pipeline but can be practiced with many other pipeline arrangements. Those skilled in the art will be able to apply the invention to many pipelines.

SUPER-SCALAR PIPELINES

Two or more pipelines as described above may be provided, allowing for two or more instructions to complete the pipelines in the same processor clock cycle. Each pipeline may be adapted for processing a subset of the operations in an instruction set. The decode stage for each of the pipelines is combined into a decode and dispatch unit which is capable of decoding several instructions in one clock cycle. The decode unit examines the types of instruction that it has just decoded to determine to which pipelines to send each instruction. The decode and dispatch unit then dispatches each instruction to the designated pipeline(s). Additional decoding may be performed in the decode stage by each individual pipeline after the instruction has been dispatched. Empty stages can be filled if downstream stages are stalled.

Figure 2:
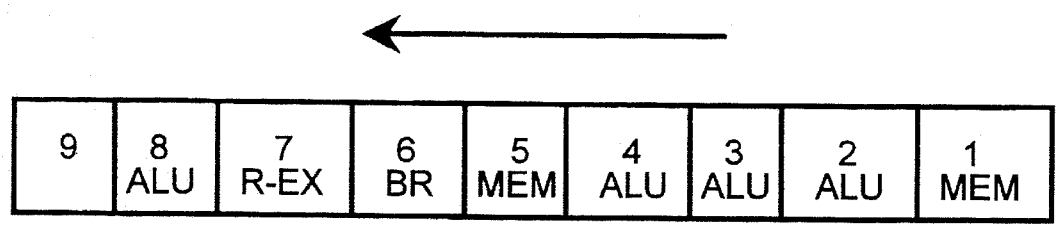
FIG. 2 shows a stream of instructions to be processed.
Figure 3:
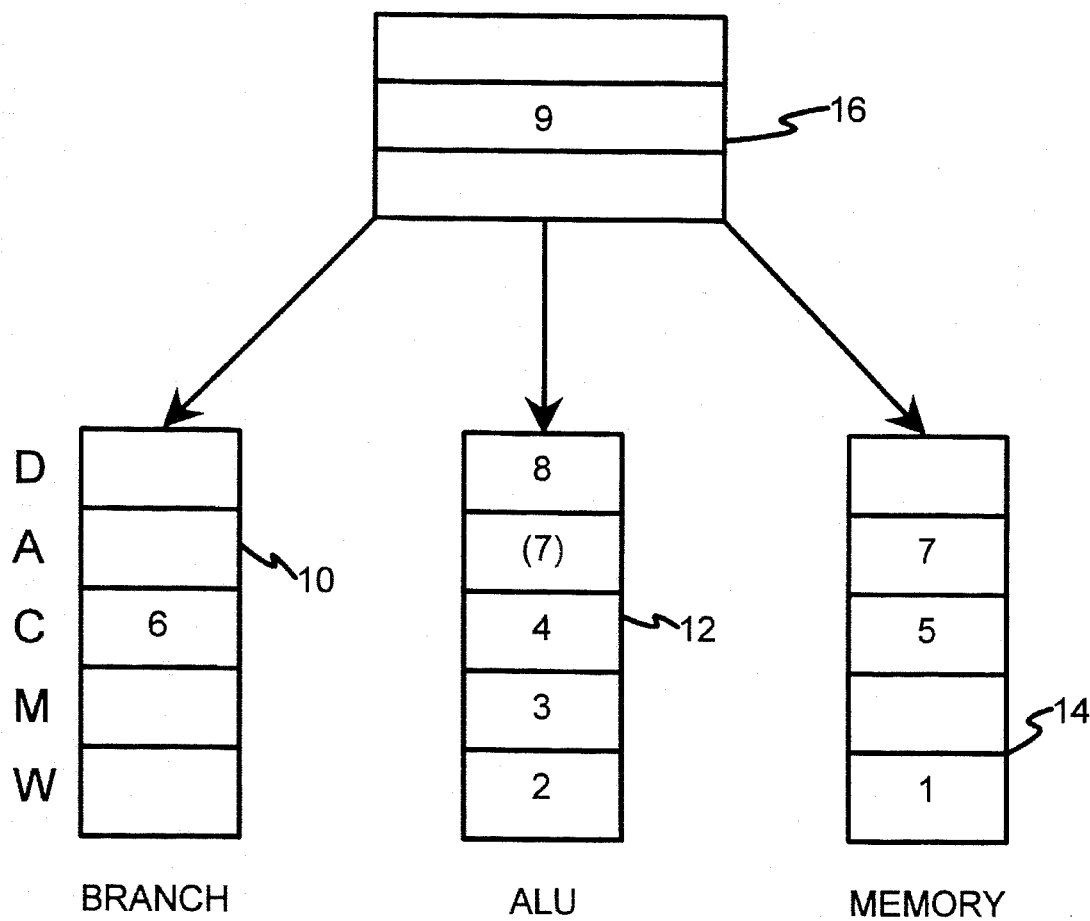
FIG. 3 shows three pipelines of a super-scalar processor: a branch pipeline, an ALU pipeline, and a memory pipeline.

FIG. 2 shows a stream of instructions to be processed. Instruction 1 is the first to be processed, followed by instruction 2, 3, and so forth. For this illustration, no taken branches are encountered so that the instructions are processed in sequential order. FIG. 3 shows as an example a super-scalar processor which has three pipelines: a branch pipeline 10, an ALU pipeline 12, and a memory pipeline 14. Branch pipeline 10 is adapted for processing simple branch instructions and generating target addresses, and may contain branch prediction logic in the early stages such as the D stage. ALU pipeline 12 is designed to process arithmetic and Boolean logic instructions, and includes an ALU with an adder. Memory pipeline 14 is for processing load and store instructions. An address of an operand is generated in the A stage, and the operand is fetched or written to a cache in the C and M stages. Should the operand not be available in the cache, a secondary cache or main memory may have to be accessed, resulting in a pipeline stall until the operand is retrieved from the slower cache or main memory. A very fast cache could allow the M stage to be eliminated, while slower caches might require that an additional M2 stage be inserted into the pipeline.

Instructions are dispatched to one or more of the pipelines 10, 12, 14 by a dispatch unit 16 in the decode stage. Once an instruction is dispatched to the first (D) stage of a pipeline, it flows down the pipeline until the W stage is reached. The instruction completes processing when it leaves the W stage. Up to three instructions may complete the W stage in any clock cycle, and up to three instructions may be dispatched to the D stage at the start of the pipelines. Pipeline stalls, when an instruction does not advance to the next stage in the pipeline, may occur in any of the three pipelines 10, 12, 14. For simplicity, the preferred embodiment stalls all three pipelines when a stall occurs in any one pipeline. Thus instructions that are dispatched together in a group will stay together as they travel down the pipelines. The stall directly affects one stage in the three pipelines: a stall in the C stage of the memory pipeline will also stall the C stage of the branch and ALU pipelines, but not any other stages. Of course, upstream stages may have to be stalled because the instruction in the stalling stage did not advance.

FIG. 3 shows a point in time when instructions 1 and 2 are completing the pipeline, being in the final W stage. Instruction 1 is a memory instruction while 2 is an ALU instruction. Since instruction 3 is also an ALU instruction, no instruction was dispatched to the branch pipeline when instructions 1 and 2 were dispatched, as out-of-order instruction execution is not allowed in this embodiment. Instead, instruction 3 had to wait to be dispatched until the next clock cycle. Instruction 4 is also an ALU instruction, so no instructions could be dispatched to the branch and memory pipelines when instruction 3 was dispatched. During the cycle that instruction 4 was dispatched, instructions 5 and 6 were also dispatched to the memory and branch pipelines. Thus three instructions were dispatched during the same clock cycle. These three instruction are called a group of instructions because all three instructions were dispatched during the same clock cycle. Also, the first dispatch was a group of two instructions, instructions 1 and 2.

Instruction 7 is a compound ALU-memory instruction requiring both the memory and the ALU pipelines. Instruction 7 could be a fetch-execute CISC instruction that first fetches an operand from memory, and then uses this fetched operand in an arithmetic operation. Because instruction 8 is also an ALU instruction, and not a branch instruction, instruction 8 must wait another clock cycle to be dispatched since instruction 7 is already using the D stage of the ALU pipeline. If instruction 9 is a simple branch instruction, it may also be dispatched with instruction 8. Likewise, if instruction 9 is a simple memory instruction, it may be dispatched to the memory pipeline during the same clock cycle that instruction 8 is dispatched. However, if instruction 9 is an ALU instruction, or a compound branch or memory instruction requiring the ALU pipeline, then instruction 9 must wait another clock cycle until instruction 8 clears the D stage of the ALU pipeline.

The preferred embodiment has just one branch pipeline. Thus any group of instruction can have at most one branch instruction. This greatly simplifies the logic required to implement the invention.

ADDRESS TRACKING - BASIC CONCEPT

The address of any instruction in the pipelines may be needed because any instruction can have an exception. The addresses of branch instructions is also needed. Thus tracking the addresses of all instructions in the pipelines is desirable.

The basic concept of the invention is to provide an exit register at the end of the pipelines. This exit register tracks the address of instructions completing the pipelines. This exit register is similar to the program counter which is used to keep track of which instructions to fetch and decode. The program counter is typically incremented as each new instruction is fetched and decoded. However, the program counter keeps track of the addresses of instructions as they enter the pipelines. While the preferred embodiment has an equivalent to the program counter, it also has a separate exit register to keep track of the address of instructions completing or exiting the pipelines.

The exit register contains the address of the next instruction to complete or exit the pipelines. Thus it contains the address of the oldest instruction in the pipelines. An array of valid bits indicates where valid instructions are located in the pipelines. The valid bits are encoded with the execution order of the instructions in each stage. The length (in bytes) of each instruction is also encoded or stored with the valid bits if the instructions are not all the same length.

EXAMPLE - SEQUENTIAL INSTRUCTIONS

When all instructions are executed sequentially, as when no taken branches are encountered, the address of any instruction in any of the pipelines may be easily calculated. It is merely necessary to "count" instructions backwards through the pipelines. Instructions are counted from the oldest instruction in the pipelines up to the instruction whose address is desired. An arrangement of instructions in 3 pipelines is diagrammed below where instruction 1 is the oldest instruction, and instruction 7 is the instruction whose address is desired. The columns refer to the order the instructions were issued to the pipelines: not to the actual pipelines themselves. Thus instructions 1 and 4 may have been issued to different pipelines.

| Stage | 1st Issued | 2nd Issued | 3rd Issued |
|-------|------------|------------|------------|
| D     |            |            |            |
| A     | 7          |            |            |
| C     | 5          | 6          |            |
| M     | 4          |            |            |
| W     | 1          | 2          | 3          |

The address of any "newer" instruction in the pipelines is obtained by adding the address of the oldest instruction, stored in the exit register, to the total length of all the instructions from the oldest instruction to the desired instruction. This usually includes the length of the oldest instruction, but not the length of the desired instruction, although some architectures may define addresses differently.

For the example diagrammed above, if all instructions are 4 bytes in length, and there are 5 instructions between the oldest instruction (1) and the instruction whose address is desired (7), and the address of the oldest instruction is 500 (in decimal arithmetic), then the desired addresses is calculated as:

| address of oldest instruction | + | length of oldest instruction | total length of instructions between | = | desired address |
|---|---|---|---|---|---|
| 500 | + | 4 bytes | 5 instructions × 4 bytes/ instruction | = | 524 |

The pipeline valid bits can be used by calculation logic inside a CPU to accomplish this calculation. For the example above, the valid bits would indicate 3 valid instruction in the W stage, 1 valid instruction in the M stage, 2 valid instructions in the C stage, and 1 valid instruction in the A stage. The calculation logic would add the length of the 3 instructions in the W stage to the lengths of the 1 and 2 instructions in the M and C stages to get the address of the first instruction in the A stage.

EXAMPLE - SEQUENTIAL INSTRUCTIONS WITH VARIABLE LENGTHS

Each instruction contains various fields of information, such as an opcode indicating the type of operation encoded by the instruction, register select fields, immediate data, and masking fields. Each instruction occupies some number of bytes of memory when stored. The number of bytes is referred to as the length of the instruction. RISC instruction sets such as for the PowerPC™ have a constant instruction length of 4 bytes for most or all instructions. However, CISC instruction sets typically have variable instruction lengths, from 1 to 15 or more bytes.

When the instructions have variable lengths, then these lengths are preferably stored with the pipeline valid bits. In the example above, if the instructions have the following lengths stored:

| Instruction | Length(bytes) | Address |
|-------------|---------------|---------|
| 1 | 4  | 500 |
| 2 | 6  |     |
| 3 | 3  |     |
| 4 | 8  |     |
| 5 | 4  |     |
| 6 | 4  |     |
| 7 | 10 | ?   |

Then the desired address of instruction 7 is the address of the oldest instruction, 500, added to the length of the oldest instruction itself, and the length of instructions 1 to 6. Thus the address of instruction 7 is:

500+4+6+3+8+4+4=500+29=529.

EXAMPLE - NON-SEQUENTIAL INSTRUCTIONS

When the pipelines contain an instruction that is a taken branch, the sequential order of the instructions is broken. An instruction stream discontinuity exists between the branch instruction and its target—at the end of the branch instruction and the beginning of the target instruction.

The above-described address tracking method can be used with a modification. Using the address of the oldest instruction is no longer appropriate since a discontinuity is present. Instead, the address of the target is used as the starting point, and the length of instructions from the target instruction to the desired instruction is added to the target instruction's address. The diagram below shows a taken branch, instruction 4, and the target of the branch is instruction 5. The sequential addresses of instructions 1 to 4 are suddenly broken at the beginning of target instruction 5, which has a non-sequential address. However, the addresses of instructions 5 to 8 are sequential.

| Stage | 1st Issued | 2nd Issued | 3rd Issued |
|-------|------------|------------|------------|
| D     |            |            |            |
| A     | 7          | 8          |            |
| C     | 6          |            |            |
| M     | 4 - Branch | 5 - Target |            |
| W     | 1          | 2          | 3          |

In the above diagram, if instruction 1 has the address 500, while the target instruction 5 has the address 320 (a branch backwards), and all instructions have a length of 4 bytes, then the desired address of instruction 8 is the target instruction's address added to the length of instructions 5, 6, and 7, or:

320+3×4 bytes/instruction=332.

Hardware Needed for Non-Sequential Address Tracking

Since the target address is used in the calculation, rather than the oldest instruction's address stored in the exit register, the target address must be stored. This is accomplished by having a target address register in each stage of the pipeline that processes branch instructions. In the above example, the target address register in the M stage holds the address of the target instruction, 320. The target address is preferably stored in the stage that the branch instruction is in, rather than the target instruction's stage.

If several taken branches are in the pipelines when an address is desired, then the calculation uses the address of the last target before the desired instruction. Other targets are ignored. Target addresses are normally computed in the first or second stage of the branch pipeline and are simply piped down each stage of the pipeline.

ADDRESS TRACKING REGISTERS - FIG. 4

Figure 4:
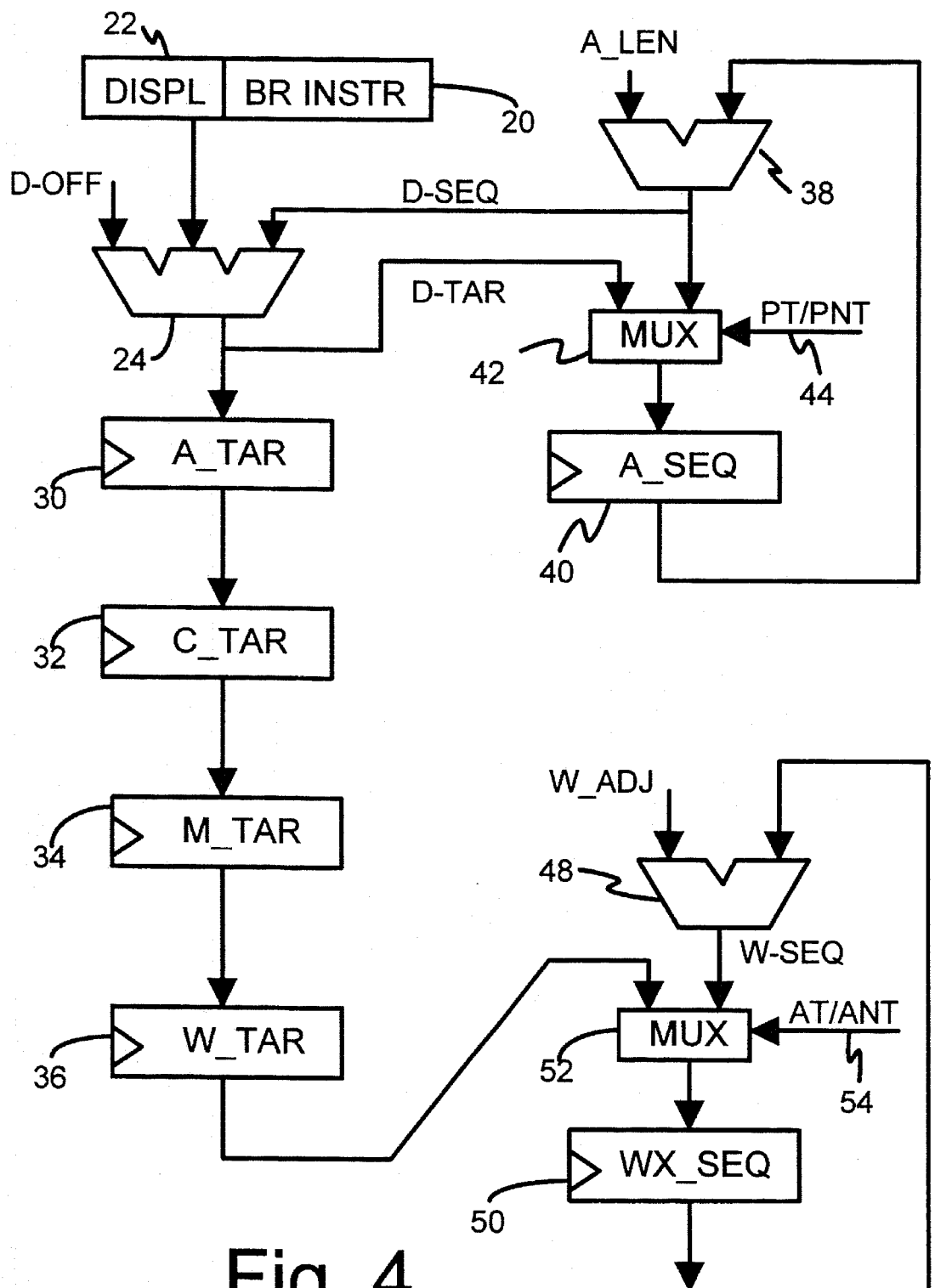
FIG. 4 shows registers and hardware used for address tracking.

FIG. 4 shows registers and hardware used for address tracking that may be located in a branch pipeline. A branch instruction is fetched and loaded into an instruction buffer 20. The target of the branch instruction is preferably generated early in the branch pipeline, such as in the decode (D) stage. The target address is usually calculated as the current address, that is, the address of the branch instruction, added to a displacement that is specified as a displacement field 22 in the branch instruction. Accordingly, the displacement field 22 is added by target adder 24 to the sequential address of the first instruction in the decode stage, D-SEQ. If the first instruction of the group in the D stage is not the branch instruction, then an offset, D_OFF, must also be input to target adder 24 to get the correct target address. The offset, D_OFF, is the difference between the address of the first instruction in the group and the address of the branch instruction being decoded. The target address in the D stage, D-TAR, generated from target adder 24, is latched into the target address register 30 for the A stage, A_TAR. This target address is clocked down the pipeline along with the branch instruction to registers 32, 34, and 36 for the C, M, and W stages.

The sequential address of the first instruction in the second stage, the A stage, is kept track of by the A-stage sequential register 40. Incrementer 38 adds the A-stage sequential address from register 40 to the total length of all the instructions in the A stage, A_LEN, to yield the sequential address of the first instruction in the D stage, D-SEQ. Thus incrementer 38 "increments" the address of the first instruction in the A-stage, which is stored in register 40, by the length of all the instructions in the A stage, producing the address of the first instruction in the D stage.

Multiplexer or mux 42 selects the D-SEQ address from incrementer 38 which is then clocked into the A-stage sequential register 40 when the instructions in the D stage are clocked down to the A stage. However, if a branch is predicted taken, then the target address D-TAR generated by target adder 24 is selected by mux 42 for loading into A-stage sequential register 40. Since mux 42 selects either the sequential address D-SEQ or the target address D-TAR based on a prediction of the outcome of the branch, the wrong address may be loaded into A-stage sequential register 40. Mux 42 is controlled by predicted taken/not taken signal 44, which is generated by a branch prediction unit which predicts the outcome of the branch instruction being decoded.

W-Stage Sequential Register

Because A-stage sequential register 40 may contain the wrong address when the prediction on signal 44 is incorrect, a sequential address that is always correct must be stored so that the processor can recover from a mis-prediction. Since the actual outcome of the branch may depend on condition codes that may not be available until the last stage of the pipeline, the sequential address that is always correct is generated and stored in the W stage. This W-stage sequential address is stored in register 50. An incrementer 48 adds an adjust value, W_ADJ, to the output of register 50 to produce the W-stage sequential address, W-SEQ. The W-stage sequential address, W-SEQ, is the address of the first instruction presently in the W stage. At the end of the clock cycle, mux 52 will select either this sequential address W-SEQ, or the target address in W-stage target register 36, depending on the actual outcome of the branch, which is indicated on actual taken/not taken signal 54. Because the W stage is the last stage of the pipelines, the actual outcome of the branch is known with certainty by the end of the W stage's clock cycle. Thus a wrong address will not be loaded into register 50 due to mis-predictions, as was the case with A-stage sequential register 40.

The address stored in W-stage sequential register 50 is the address of the first instruction of the last group of instructions that completed the W stage in the last clock cycle. The adjust value, W_ADJ, is normally the length of all the instructions that exited the W stage during the last clock cycle. The output of incrementer 48, W-SEQ, is the sequential address of the first instruction that is currently in the W stage. Register 50 is labeled WX_SEQ because it holds the W-SEQ address for a phantom X stage after the W stage.

When a branch is actually taken, then mux 52 selects the target address. On the next clock cycle, after the target instruction has completed the W stage, the adjust value, W_ADJ, is the length of the target instruction and any instructions following the target instruction that completed the W stage in the last clock cycle. When no branch is taken, the adjust value, W_ADJ, is the total length of all the instructions in the W stage.

The next value loaded into the WX_SEQ register 50 is thus W_TAR when AT=1, or WX_SEQ+W_ADJ when AT=0. Likewise, the next value loaded into the A_SEQ register 40 is A_TAR when PT=1, or A_SEQ+A_LEN when PT=0, where A_LEN is the total length of all the instructions currently in the A stage. The target address, D-TAR, is calculated as D-SEQ+D_OFF+Displacement, where D_SEQ is the address of the first instruction in the D stage, D_OFF is the offset of the branch instruction in the D stage from the first instruction in the D stage, and the displacement is usually a field in the branch instruction.

A special case exists when branch prediction is used. A correctly predicted taken branch may cause an instruction after the target instruction, as well as a correctly fetched target, to be in the same group as the branch instruction. When the WX_SEQ register 50 is updated, the length of the target and any instructions following the target in a group must be added to the adjust value, W_ADJ. This allows a group of instructions dispatched together to contain both a branch and its target instruction. A group may thus contain an instruction stream discontinuity within the group itself. The discontinuity does not have to be at the beginning or ending of a group; the discontinuity can be anywhere in the group. A separate adder (not shown) may be needed to add the adjust to the target, or the muxing may be re-arranged or an extra clock cycle taken.

Another special case is when a mis-prediction occurred. When the prediction is not taken, instructions will continue to be dispatched from the sequential stream. If the branch is actually taken, then these instructions will have to be discarded or purged from the pipelines. Fetching will resume from the target address. The W-stage target from register 36 is loaded into the WX_SEQ register 50. The adjust value is set to zero, but is actually a "don't care" since mux 52 takes the target directly without adding the adjust. If the prediction was for taken, then the instructions in the pipelines are from the target stream. If the branch was not actually taken, then these target stream instructions must be discarded. The adjust value, W_ADJ, is set to the length of all instructions in the group up to and including the branch instruction. The A_SEQ register must also be updated when a misprediction is detected. In summary, the four cases are shown in Table 1.

TABLE 1

WX_SEQ Update

| Case | Next WX_SEQ | W_ADJ value |
|---|---|---|
| PT, AT | W_TAR | length after branch |
| PT, ANT | WX_SEQ + W_ADJ | length before target |
| PNT, AT | W_TAR | 0 |
| PNT, ANT | WX_SEQ + W_ADJ | total length of all instructions |

In concept, an exit register could be provided that stores W-SEQ, the address of the oldest instruction in the W stage. Because of timing requirements, the preferred embodiment, described above, has the exit register storing the previous value of W-SEQ, and generating the new W-SEQ in conjunction with the incrementer 48. The preferred embodiment uses a very high speed clock, so the address tracking calculation is split up over two clock cycles. It is conceptually simpler to set up the calculations in a first cycle using a "phantom" register holding W-SEQ, and then complete the calculation in the second cycle, when the W_SEQ value is clocked down to the physical WX_SEQ register. Thus the examples that follow will refer to the WX_SEQ register to emphasize that the W-SEQ value is used, but the calculation is completed in the following clock cycle when W-SEQ is in the WX_SEQ register.

PIPESTAGE VALID BITS

An instruction dispatcher loads valid bits for the pipelines 10, 12, 14 into a pipeline valid array. The Pipeline valid array 40 contains an entry for each stage in the pipelines. Thus it has 5 entries: one for each of the D, A, C, M, and W stages. Each entry in a pipeline valid array indicates which pipelines have valid functional control words in the stage corresponding to that entry. A simple implementation would be to have a valid bit for each pipeline for each entry, or to have a second bit for each pipeline stage indicating if the pipeline is the primary or a secondary pipeline for that instruction.

The preferred implementation also encodes information about the sequence or order of instructions in that stage or group. As a simplification for the preferred embodiment, only a branch instruction can be dispatched as the third instruction in a group. The ALU pipeline stage could contain either the first or the second instruction in the group of instructions all dispatched in the same clock period. Likewise, the branch pipeline stage could contain either the first, second, or third instruction in the group. Table 2 shows the encoding of an entry in the pipeline valid array. A "don't care" in the encoding is designated as "x".

TABLE 2

Encoding of Pipeline Valid Entry

| Encoding for Issue Time-Slot: | | | |
|---|---|---|---|
| 1st | 2nd | 3rd | Meaning |
| 00 | xx | x | No Instruction in 1st Issue Time-Slot |
| 01 | xx | x | Valid ALU in 1st Issue Time-Slot |
| 10 | xx | x | Valid Memory Op in 1st Issue Time-Slot |
| 11 | xx | x | Valid Branch in 1st Issue Time-Slot |
| xx | 00 | x | No Instruction in 2nd Issue Time-Slot |
| xx | 01 | x | Valid ALU in 2nd Issue Time-Slot |
| xx | 10 | x | Valid Memory Op in 2nd Issue Time-Slot |
| xx | 11 | x | Valid Branch in 2nd Issue Time-Slot |
| xx | xx | 0 | No Instruction in 3rd Issue Time-Slot |
| xx | xx | 1 | Valid Branch in 3rd Issue Time-Slot |

The encodings of table 2 are for each of the three issue time-slots for up to three instructions in a group. The 1st issue time-slot is encoded for the type of instruction that was issued first, from a first instruction decoder. The 2nd issue time-slot is encoded for a second instruction decoded by the second instruction decoder, while the third issue time-slot is encoded for a third instruction decoded by the third instruction decoder. Thus the first and second issue time-slots can encode any type of instruction, while the third issue time-slot can only encode simple branch instructions.

An encoding of 01 11 0 would indicate an ALU instruction followed by a branch instruction, with no third instruction in the group. An encoding of 10 01 1 indicates a memory instruction, followed by an ALU instruction, and then a branch instruction, for a total of three instructions in the dispatched group. An encoding of 00 10 11 would not be valid because it encodes no valid instruction in the first issue time-slot but instructions in the second and third issue time-slots. Likewise an encoding of 10 00 1 is not valid because it encodes a valid instruction in the third issue time-slot but not in the second issue time-slot. Earlier issue time-slots are filled up before the later issue time-slots.

Figures 5, 6:
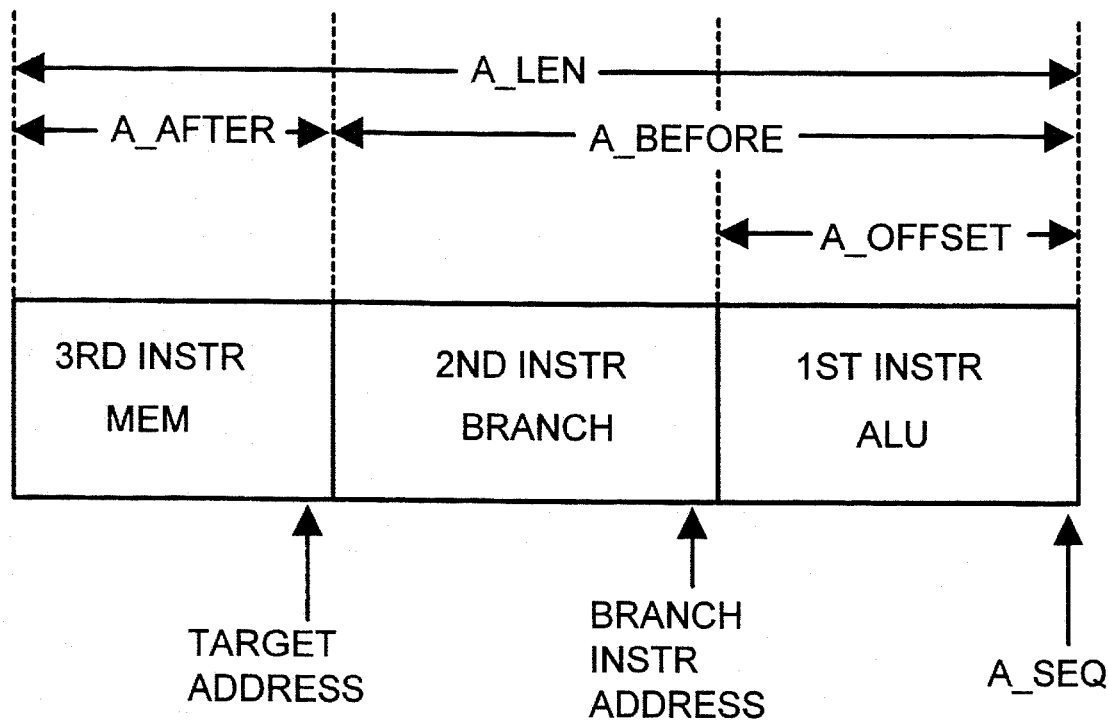
FIG. 5 shows the pipeline valid array.
FIG. 6 is a diagram illustrating a group of three instructions that were dispatched together during the same clock cycle.

FIG. 5 shows the pipeline valid array. An entry is provided for each of the stages D, A, C, M, W. The entry is shared by all pipelines. The pipeline valid bits are encoded into a first, second, and third fields for the first, second, and third issued instructions as shown in Table 2. The length of the first and second instructions are encoded into length fields LEN1 and LEN2. When a branch instruction is predicted in the D stage, an unresolved branch bit is set to indicate that the stage has a branch that has been predicted but not yet resolved to determine its outcome, taken or not taken. The predicted taken/not taken bit is also written to the array. Once the branch has been resolved, the predicted taken/not taken bit is over-written with the actual taken/not taken bit AT and the un-resolved bit is cleared. Each stage's entry is clocked down to the next stage's entry when the stage's group of instructions advance to the next stage.

INSTRUCTION LENGTH DETERMINATION - FIG. 6

FIG. 6 is a diagram illustrating a group of three instructions that were dispatched together during the same clock cycle. The instructions are currently in the A stage. The first instruction is an ALU instruction dispatched to the ALU pipeline, while the second instruction is a branch. The third instruction, a memory instruction, is the target of the branch instruction. The A_SEQ register points to the address of the first instruction. A_LEN is the total length of all three instructions. A_OFFSET is the offset from the address of the first instruction to the address of the branch instruction. A_BEFORE is the length of the instructions up to the end of the branch instruction, the point where an instruction stream discontinuity may exist. A_AFTER is the length of the instructions after the branch instruction.

These lengths defined by FIG. 6 are useful for designing the calculation logic for address tracking. The branch instruction can appear in any issue slot, either the first, second, or third instruction, and the definitions hold. When the branch is the first issued instruction, then A_BEFORE is equal to the length of the branch instruction, and A_OFFSET is zero. When the branch instruction is the last instruction, then A_AFTER is zero. These lengths may be calculated for any or all stages, and these definitions can easily be extended to four or more pipelines.

The pipeline valid bits stored in the pipeline valid array of FIG. 5 and defined in Table 2 can be used as inputs to a logic network for generating values for the lengths defined in FIG. 6. Table 3 shows how the valids could be used to generate these lengths for the PowerPC™ instruction set where instructions are all 4 bytes in length.

TABLE 3

RISC Length Generation

| Valid Bits | Meaning | _LEN | _BEFORE | _AFTER | _OFF-SET |
|---|---|---|---|---|---|
| 00 00 0 | - - - | 0 | | | |
| 01 00 0 | ALU - - | 4 | | | |
| 10 00 0 | Mem - - | 4 | | | |
| 11 00 0 | Br - - | 4 | 4 | 0 | 0 |
| 10 01 0 | M A - | 8 | | | |
| 11 01 0 | Br A - | 8 | 4 | 4 | 0 |
| 01 10 0 | A M - | 8 | | | |
| 11 10 0 | Br M - | 8 | 4 | 4 | 0 |
| 01 11 0 | A Br - | 8 | 8 | 0 | 4 |
| 10 11 0 | M Br - | 8 | 8 | 0 | 4 |
| 01 10 1 | A M Br | 12 | 12 | 0 | 8 |
| 10 01 1 | M A Br | 12 | 12 | 0 | 8 |

For x86 CISC instructions, the length can vary from 1 to 15 bytes. As a simplification for the preferred embodiment, only two CISC instructions can be dispatched together. The length of each CISC instruction is determined by the decode unit and stored in the LEN1 or LEN2 fields of the pipeline valid array of FIG. 6. In Table 4, the length of the first instruction is designated "A", while the length of the second instruction is "B".

TABLE 4

CISC Length Generation

| Valid Bits | Meaning | _LEN | _BEFORE | _AFTER | _OFF-SET |
|---|---|---|---|---|---|
| 00 00 0 | - - - | 0 | | | |
| 01 00 0 | ALU - - | A | | | |
| 10 00 0 | Mem - - | A | | | |
| 11 00 0 | Br - - | A | A | 0 | 0 |
| 10 01 0 | M A - | A + B | | | |
| 11 01 0 | Br A - | A + B | A | B | 0 |
| 01 10 0 | A M - | A + B | | | |
| 11 10 0 | Br M - | A + B | A | B | 0 |
| 01 11 0 | A Br - | A + B | A + B | 0 | A |
| 10 11 0 | M Br - | A + B | A + B | 0 | A |

The processor can support both CISC and RISC instructions by implementing both of Tables 3 and 4 in the calculation logic network and enabling or selecting the RISC or CISC result depending on the type of instructions in the group. Alternatively, RISC instructions can have the value "4" loaded into the LEN 1 and LEN2 fields. When the 3rd issue slot has a valid instruction, then the logic can safely use the RISC encodings of Table 3 since the third issue slot is only occupied when RISC instructions are dispatched. Preferably both RISC and CISC instructions are not dispatched together in the same group, but adjacent groups can have different instruction sets. For example, the A stage can have CISC instructions, while the D or C stages have RISC instructions.

CALCULATION OF ADDRESSES OF INSTRUCTIONS IN PIPELINES

Using the length information generated by logic that implements decoding of the pipeline valid bits and length fields, as described above, the desired address of any instruction in the pipelines can be calculated. Instruction lengths are generated for each stage in the pipelines as described above for the A stage. Some of these generated lengths are selected for use as an adjustment input. This adjustment input is added to a base value that is an address stored in an address tracking register. The address is a sequential address when the W-stage sequential register is selected as the base. However, if any taken branches exist between the desired instruction and the end of the pipelines, a target address is used as the base value. The target address from the most recent taken branch to the desired instruction is selected. Thus the target address register from either the A, C, M, or W stage is selected. In one case, the D-stage target is selected, which is output from target adder rather than from a register.

Thus the possible selections for the base are: D-TAR from the target adder, or the registers A_TAR, C_TAR, M_TAR, W_TAR, or WX_SEQ. In the tables that follow, the first letter before the underscore "_" represents the stage, while the total length in a stage is abbreviated "_LEN", _AFTER is abbreviated "_AFT", and _OFFSET abbreviated "_OFF".

To generate the address of any instruction that has an offset of "_OFF" from the address of the first instruction in the group, the selected base is added to the adjustment input. Although the lengths have been described in reference to a branch instruction having the offset, these calculations work for any instruction type, not just branches. Thus these calculations can be used not only to generate the addresses of branch instructions, but also to generate the addresses of any instruction having an exception.

The simplest case is for the desired instruction in the W stage having an offset W_OFF. When there are no taken branches before the desired instruction, the desired address is simply WX_SEQ+W_OFF. This calculation is also used if the desired instruction is the branch instruction, because the branch instruction occurs before the target and the instruction stream discontinuity.

If a taken branch (other than the desired instruction) also exists in the W stage, and the desired instruction is after the branch, then the address is the target address added to the offset of the desired instruction from the target. However, the preferred embodiment can issue three instructions only when the branch is the third instruction. Thus there cannot be an instruction after both the branch and target. When the branch is the first or second instruction, only two instructions can be issued together in a group. Thus the desired instruction could only be the target instruction itself when the branch instruction is in the same group with the desired instruction. In that case, the desired address is simply W_TAR. If the branch instruction is not in the same group as the desired instruction, then the WX_SEQ register holds the target address, and the desired address is again simply WX_SEQ+W_OFF. These possibilities are summarized in Table 5.

TABLE 5

W-Stage Address Calculation

| Stage | Last Taken Branch | Base Value | Adjust Input |
|---|---|---|---|
| W | None | WX_SEQ | W_OFF |
| W | W | W_TAR | 0 (Don't Care) |
| W | W + 1 | WX_SEQ | W_OFF |

The next case is for the desired instruction in the M stage having an offset M_OFF. When there are no taken branches before the desired instruction, the desired address is WX_SEQ+W_LEN+M_OFF. The total length of the instructions in the W stage, W_LEN, is added to the W-stage sequential register and to the desired instruction's M-stage offset. If a taken branch exists in the W stage, then the desired address is the W-stage target address added to the W-stage length after the branch instruction and also added to the desired instruction's M-stage offset.

The desired instruction could only be the target instruction itself when the branch instruction is in the same M-stage group with the desired instruction. In that case, the desired address is simply M_TAR. These possibilities are summarized in Table 6.

TABLE 6

M-Stage Address Calculation

| Stage | Last Taken Branch | Base Value | Adjust Input |
|---|---|---|---|
| M | None | WX_SEQ | W_LEN + M_OFF |
| M | W | W_TAR | W_AFT + M_OFF |
| M | M | M_TAR | 0 (Don't Care) |

The third case is for the desired instruction in the C stage having an offset C_OFF. When there are no taken branches at all before the desired instruction, the desired address is WX_SEQ+W_LEN+M_LEN+C_OFF. The total length of the instructions in the W and M stages, W_LEN and M_LEN, is added to the W-stage sequential register and to the desired instruction's C-stage offset. If a taken branch exists in the W or M stages, then the base value is taken from either the W-stage or M-stage target address register. The adjustment input totals the lengths of all instructions after the taken branch instruction, including the target instruction, and also the desired instruction's offset from the first instruction in its stage. These possibilities are summarized in Table 7.

TABLE 7

C-Stage Address Calculation

| Stage | Last Taken Branch | Base Value | Adjust Input |
|---|---|---|---|
| C | None | WX_SEQ | W_LEN + M_LEN + C_OFF |
| C | W | W_TAR | W_AFT + M_LEN + C_OFF |
| C | M | M_TAR | M_AFT + C_OFF |
| C | C | C_TAR | 0 (Don't Care) |

The fourth case is for the desired instruction in the A stage having an offset A_OFF. When there are no taken branches at all before the desired instruction, the desired address is WX_SEQ+W_LEN+M_LEN+C_LEN+A_OFF. The total length of the instructions in the W, M, and C stages, W_LEN, M_LEN, and C_LEN, is added to the W-stage sequential register and to the desired instruction's A-stage offset. If a taken branch exists in the W, M, or C stages, then the base value is taken from either the W-stage, M-stage, or C-stage target address register. The adjustment input totals the lengths of all instructions after the taken branch instruction, including the target instruction, and also the desired instruction's offset from the first instruction in its stage. These possibilities are summarized in Table 8.

TABLE 8

A-Stage Address Calculation

| Stage | Last Tkn Br | Base Value | Adjust Input |
|---|---|---|---|
| A | None | WX_SEQ | W_LEN + M_LEN + C_LEN + A_OFF |
| A | W | W_TAR | W_AFT + M_LEN + C_LEN + A_OFF |
| A | M | M_TAR | M_AFT + C_LEN + A_OFF |
| A | C | C_TAR | C_AFT + A_OFF |
| A | A | A_TAR | 0 (Don't Care) |

The last case is for the desired instruction in the D stage having an offset D_OFF. When there are no taken branches at all before the desired instruction, the desired address is WX_SEQ+W_LEN+M_LEN+C_LEN+A_LEN+D_OFF. The total length of the instructions in the W, M, C, and A stages, W_LEN, M_LEN, C_LEN, and A_LEN is added to the W-stage sequential register and to the desired instruction's D-stage offset. If a taken branch exists in the W, M, C, or A stages, then the base value is taken from either the W-stage, M-stage, C-stage, or A-stage target address register. The adjustment input totals the lengths of all instructions after the taken branch instruction, including the target instruction, and also the desired instruction's offset from the first instruction in its stage. These possibilities are summarized in Table 9.

TABLE 9

| | | | D-Stage Address Calculation |
|---|---|---|---|
| Stage | Last Tkn Br | Base Value | Adjust Input |
| D | None | WX_SEQ | W_LEN + M_LEN + C_LEN + A_LEN + D_OFF |
| D | W | W_TAR | W_AFT + M_LEN + C_LEN + A_LEN + D_OFF |
| D | M | M_TAR | M_AFT + C_LEN + A_LEN + D_OFF |
| D | C | C_TAR | C_AFT + A_LEN + D_OFF |
| D | A | A_TAR | A_AFT + D_OFF |
| D | D | D_TAR | 0 (Don't Care) |

Although the A stage contains a sequential address register, its value is not used for address calculation. The A-stage sequential register is loaded depending upon the predicted taken/not taken outcome rather than the actual outcome and thus may hold an erroneous address. The A-stage sequential address register is provided for building target addresses in the early part of the pipeline. The W-stage sequential register is used for address tracking within the pipelines rather than the A-stage sequential register because it always holds a correct sequential address.

Thus the address of any instruction in any of the pipelines can be calculated from the sequential address register at the end of the pipelines, and the target address registers in each stage of the super-scalar pipelines. Logic is used to generate various instruction lengths for each stage that are combined to produce an adjustment input. The adjustment input is then added to the sequential or target address to produce the desired instruction's address. More logic or an adder can be used for these calculations. If the clock cycle is small, the adjustment input may be calculated during one clock cycle, latched, and then added to the base value in the next cycle. The base value may also be pipelined such that the base value is actually retrieved from the next stage's register.

Alternately, the base value may be selected and latched before the final addition step. Timing considerations will dictate the exact implementation of the invention.

BRANCH RESOLUTION

When branch prediction is used, a decoded branch instruction is predicted to be taken or not taken, and the target address may also be predicted. However, this prediction will be wrong some of the time. Branch resolution logic is needed to determine the actual outcome of the branch. The actual outcome is often determined by a flag or condition code that is set by a prior instruction. For example, a prior ALU subtract instruction could decrement a loop variable. The branch is taken as long as the loop variable is greater than zero. When the loop variable becomes zero, the branch is no longer taken. The ALU instruction will set a zero flag when the result, the loop variable, is zero. The conditional branch can be programmed to be a taken branch when the zero flag is not set, but not taken when the zero flag is set. Prediction logic will keep predicting that the branch is taken until the time that it is finally not taken, when a mis-prediction will occur. Branch resolution logic must check this zero flag each time the branch instruction is processed, but after the ALU operation has executed.

In many prior-art systems, branch resolution was performed in the last stage of the pipeline, the W stage. This allowed time for prior instructions to set the flags that determined the branch outcome. However, some branch instructions do not depend on the flags, or the flags may have been set far in advance. This is especially the case with code written by modern optimizing compilers. Ideally, the branches are resolved as soon as possible, immediately after the resources such as the flags are available. This reduces stalls caused by waiting for the branch to resolve, and reduces the penalty to re-start the pipelines when a mis-prediction occurs.

The invention decouples the branch resolver from the W stage and allows branches to be resolved in any stage. This is a performance advantage since the correct fetching address, either the target address or the sequential address, is provided as soon as possible, allowing the processing to continue sooner than if the fetching had to wait for the W stage resolution. With branch prediction the benefit is greater. Since the branch resolver must supply an update to the branch prediction logic, the update is provided more rapidly, allowing subsequent predictions to be more accurate.

A mis-prediction requires that a recovery address, either the target address or the sequential address, be supplied to the instruction fetcher and decoder so that fetching and decoding of the correct instruction can start. Instructions after the branch instruction must be purged from the pipeline. Thus the branch resolver must supply two addresses: the recovery address of the instruction immediately after the branch instruction, which is either the target address or the sequential address, and the address of the branch instruction itself, which is used to update the branch prediction logic.

The branch resolver also provides this information to the branch prediction unit. Other information about the accuracy of the prediction may also be provided, allowing for improved prediction accuracy the next time the branch instruction is encountered.

The invention allows for one branch to be resolved each clock cycle, although embodiments providing for two or more resolutions per clock cycle are possible. A branch may be encountered on the average every 5 or 10 instructions. When more than one unresolved branch is in the pipeline, the younger branches are less and less likely to be on the actual instruction stream path. Thus the greatest benefit is in quickly resolving the oldest branch. Resolving just one branch per clock cycle reduces hardware complexity significantly.

The branch resolver checks the un-resolved branch bits in the pipeline valid array of FIG. 5 to determine which stage contains the oldest un-resolved branch. The branch resolver then checks whether the flags or other resources are available yet, and stalls resolution if the resources are not yet available. However, the branch pipeline itself is not stalled. Instructions continue to be clocked down the pipelines; the pipelines are not stalled for branch resolution.

Once the required resources are available, the branch may be resolved. A control word in the branch pipeline indicates the type of branch instruction, and indicates which resources or flags the branch outcome depends upon. The resolver compares the resource to the conditions specified by the instruction and encoded in the control word to determine if the outcome is actually taken or not taken. Then the predicted taken/not taken bit in the pipeline valid array is compared to the actual outcome, and a mis-match indicates that a mis-prediction occurred. The branch resolver clears the un-resolved bit in the pipeline valid array and overwrites the predicted taken bit in the array with the actual taken bit determined from the resources and/or flags.

MIS-PREDICT RECOVERY

When a branch has been incorrectly predicted, the instructions in the pipelines after the branch instruction are from the wrong path and must be purged or invalidated. To do this, their valid bits in the pipeline valid array are cleared. Instructions from the correct path must be fetched and dispatched to the pipelines. A recovery address must be quickly supplied to the instruction fetcher so that the correct instructions can be fetched.

The recovery address is either the target address if the branch is actually taken, or the next sequential instruction's address if the branch is actually not taken. This recovery address must be generated and supplied to the fetcher without delay once the actual outcome is known. Thus the recovery address is generated before the actual outcome is known so that the delay once the actual outcome is known is only a mux delay rather than a longer calculation delay. The recovery address to generate is for the opposite of the predicted outcome, which would be a mis-predict. Address tracking logic as described above in reference to Tables 5–9 is used to generate the recovery address. The recovery address is either the target address, which is generated in the D stage and piped down the branch pipeline, or the address of the sequential instruction following the branch instruction. The address of the sequential instruction following the branch instruction can be calculated using logic implementing Tables 5–9 by setting the offset of the sequential instruction to be the offset for the desired instruction, _OFF. The logic may be simplified by not resolving branches in the D stage, but only in stages A, C, M, and W. Thus the logic for Table 9 is not necessary, which is the most complex of the Tables. Similarly, the logic for both Tables 8 and 9 could be deleted if branches resolved no sooner than the C stage. Of course, delaying branch resolution reduces the advantages of the present invention.

The address of the branch instruction itself is also needed so that the branch prediction unit can update the prediction entry for the mis-predicted branch and clear the pipeline valid bits. The address of the branch instruction is also obtained by address tracking logic implementing Tables 5–8, with the offset _OFF set to the offset of the branch instruction to the first instruction in the group.

Figure 7:
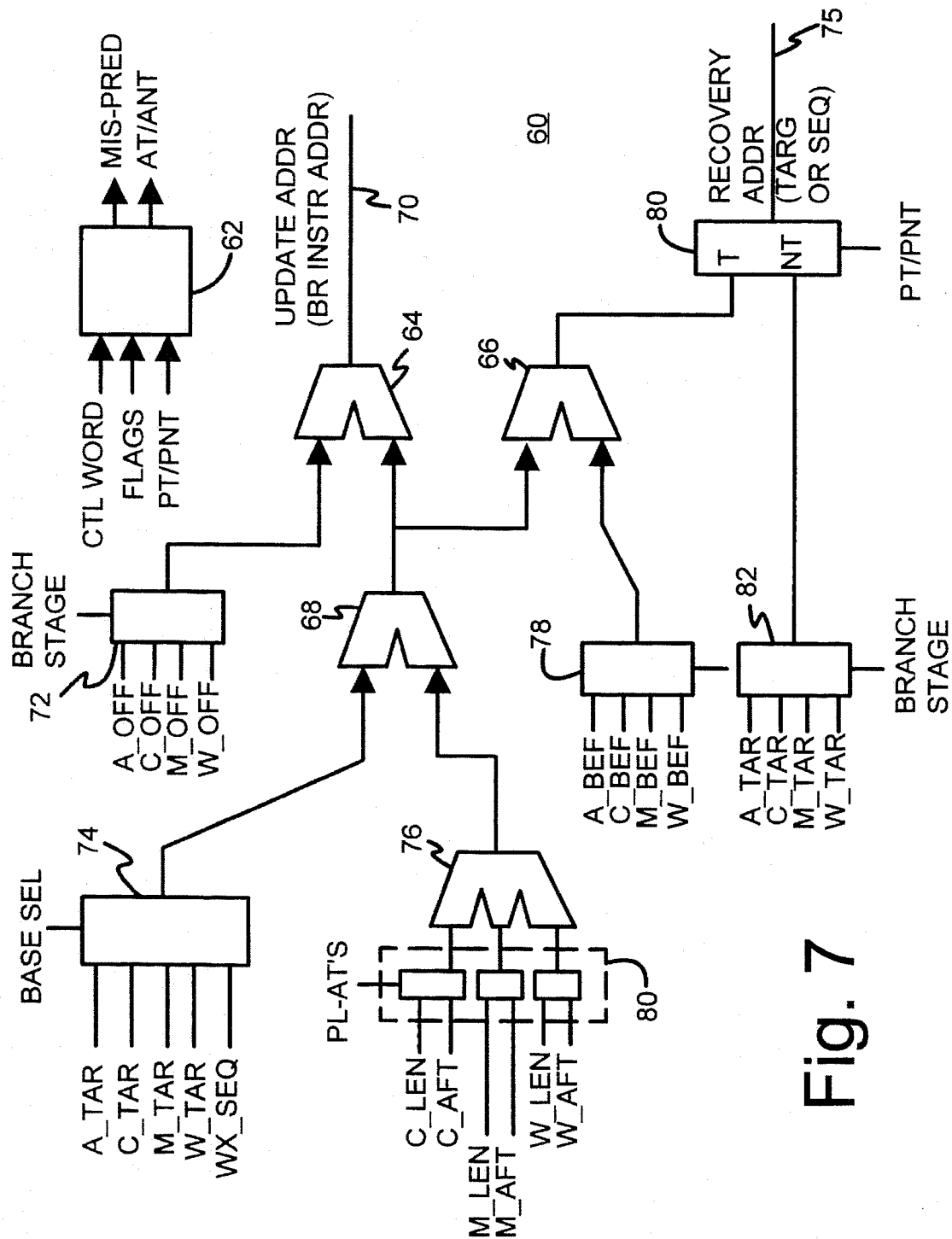
FIG. 7 shows a branch resolver.

Branch Resolver-FIG. 7

FIG. 7 shows branch resolver 60. Outcome logic 62 receives the resource such as the flags and receives the predicted outcome, PT/PNT. Outcome logic 62 also receives part of the control word for the branch instruction from the branch pipeline which determines which resources and/or flags to evaluate as the branch condition. The actual outcome, AT/ANT, is determined by comparing the resource to the control word, and a mis-predict is signaled if the predicted outcome does not match the actual outcome.

Branch resolver 60 contains address tracking logic that generates two addresses: the recovery address 75, which is sent to the instruction fetcher when a mis-predict occurs, and the update address 70, which is the address of the branch instruction that is being resolved. The address tracking logic of FIG. 7 implements the calculations of Tables 5–8.

A base value is selected by mux 74 from one of the target registers when a taken branch is present between the branch being resolved and the end of the pipelines. Otherwise, the W-stage sequential register, WX_SEQ, is chosen as the base value. An intermediate adjustment is generated from three-port adder 76. Three muxes 80 select either the total length of all the instructions in a particular stage, when no taken branch is present in that particular stage, or the length of the instructions after the taken branch instruction when that particular stage does contain a taken branch. Note that these taken branches will already have been resolved since they occur later in the pipelines than the current branch being resolved. Thus the actual taken/not taken bit in the pipeline valid array for each stage is used as the selects for three muxes 80. Any later stage with a taken branch (actual taken bit is set in pipeline valid array) will have the after length _AFT selected, while any stage with no taken branch will have the total length _LEN selected. But if _TAR is selected, then M_LEN, M_AFT, W_LEN, or W_AFT is not added. Instead, a value of zero is added.

The intermediate adjustment generated from three-port adder 76 is added in adder 68 to the base register selected by mux 74. The sum from adder 68 represents the sum of all the instructions in the pipeline stages after the stage containing the branch instruction being resolved. The offset of the branch instruction being resolved to the first instruction in the branch's stage, _OFF, is outputted by mux 72, which selects the offset from the stage of the branch instruction. The selected branch offset is added to the sum from adder 68 to produce the address of the branch instruction. This branch instruction address is generated by adder 64 and is also known as the update address 70, because the address of the branch instruction is sent to the branch prediction unit to locate the branch prediction entry corresponding to the branch instruction resolved by branch resolver 60.

Mux 78 selects the length of instructions before the target instruction, _BEF, from the stage the branch instruction is in. This length includes the length of the branch instruction, whereas the branch offset does not include the length of the branch instruction. The selected "before" length is added by adder 66 to the sum from adder 68, which represented the sum of all the instructions in the pipeline stages after the stage containing the branch instruction. The output from adder 66 is the address of the next sequential instruction after the branch instruction. Mux 80 selects this sequential address when the branch is predicted taken, and outputs this sequential address as the recovery address. Mux 80 could be controlled by the actual taken/not taken bit, but this delays the generation of the recovery address 75. Since the recovery address 75 is not used if the branch is predicted correctly, mux 80 may be safely controlled by the predicted outcome rather than the actual outcome. For a mis-prediction, the predicted outcome will be the opposite of the actual outcome.

Mux 82 selects the target address from the stage containing the branch instruction being resolved. The target instruction may actually be in another stage, but the target address is generated by the branch instruction and is kept in the branch pipeline with the branch instruction. Thus mux 82 selects the target address of the branch instruction, which is selected by mux 80 when the branch is resolved as actually taken. Mux 80 outputs the selected target address as the recovery address 75 when when the branch is predicted not taken.

Thus the recovery address 75 is the target address when the branch is predicted not taken, or the sequential address when the branch is predicted taken. The sequential address is the address of the next sequential instruction after the branch instruction, which could be calculated by adding the address of the branch instruction to the length of the branch instruction.

The recovery address is used to "recover" from a mis-prediction. When the prediction was not taken, then sequential instructions after the branch instruction were fetched and dispatched into the pipelines. If the branch was actually taken, then a mis-prediction occurred, and these sequential instructions must not be allowed to complete; they must be purged.

The recovery address 75 is the target address, which is sent to the instruction fetcher so that the target instruction can be fetched and processing can resume along the actual path. When the prediction was taken, the target instruction and instructions following the target instruction were fetched and dispatched into the pipelines. These instructions must be purged if the branch outcome is actually not taken, a mis-prediction.

The recovery address 75 is the address of the next sequential instruction after the branch instruction. This recovery address 75 is quickly transmitted to the instruction fetcher so that this next sequential instruction, and instructions following it, can be fetched and dispatched to the pipelines so that processing can resume along the correct, not taken, path.

The recovery address 75 and the update address 70 are preferably generated before the outcome has been determined, reducing the delay to supply the recovery address to the instruction fetcher and resuming processing. The embodiment of branch resolver 60 in FIG. 7 pre-calculates these addresses as soon as possible. Once the actual outcome is determined by outcome logic 62, the only delay in generating the final recovery address 75 is the delay for mux 80, which selects either the sequential address from adder 66 or the target address from mux 82. Since the sequential and target addresses are pre-calculated if possible, the recovery address 75 is generated as rapidly as possible.

The address calculations performed by the logic of FIG. 7 is preferably performed over two clock cycles. Pipeline registers are added and source registers and lengths are adjusted for the pipeline clocking. If the entire calculation is performed in one cycle, then W-SEQ from the incrementer, rather than the WX_SEQ register, which is W-SEQ delayed by one cycle, should be used. However, generating W-SEQ can take several levels of logic which may have too much delay for one clock cycle.

Figure 8:
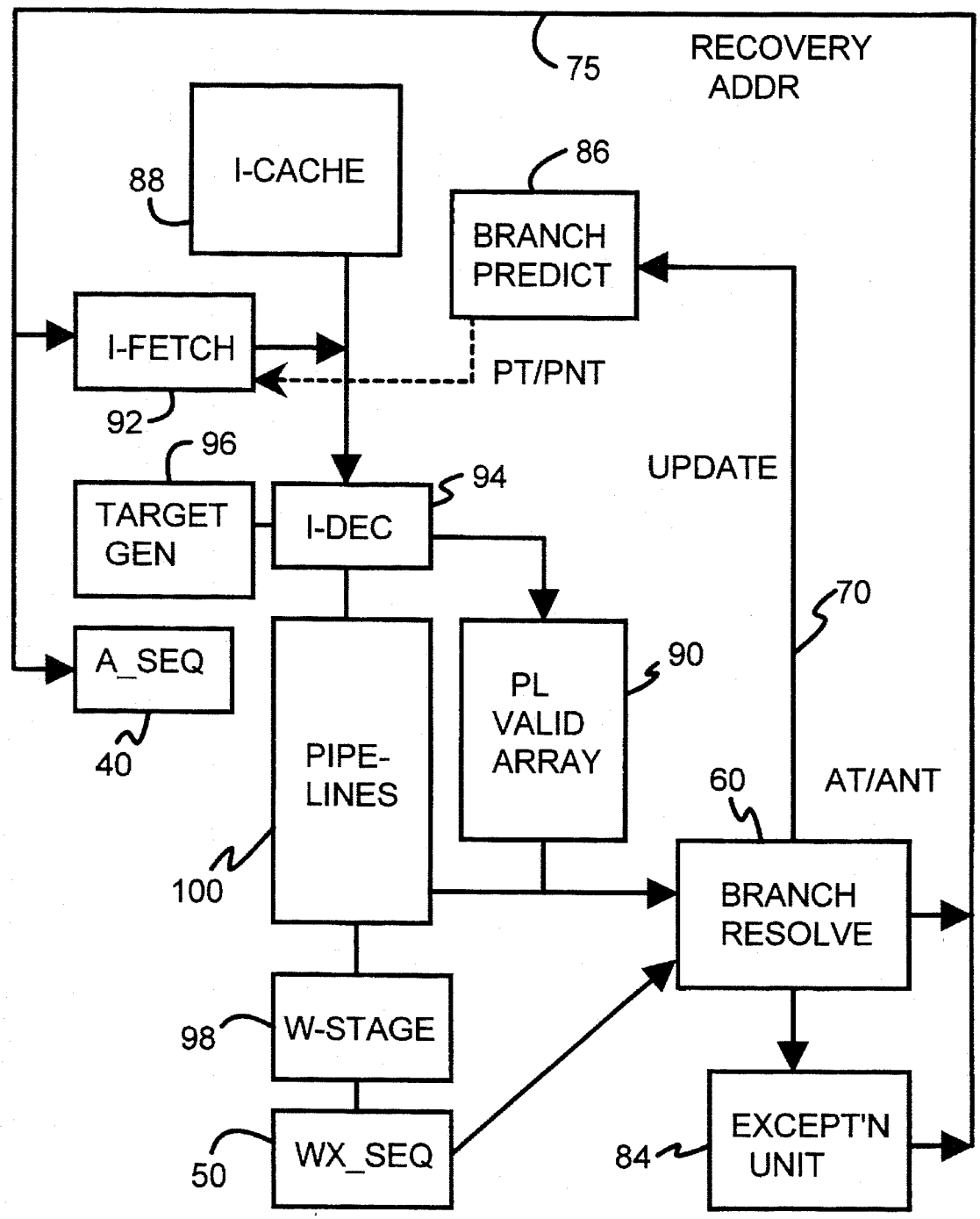
FIG. 8 is a diagram of the re-locatable branch resolver in a pipelined processor.

Recovery and Update Addresses-FIG. 8

FIG. 8 is a diagram of the re-locatable branch resolver in a pipelined processor. The pipelined processor has an instruction cache 88 from which instructions are fetched by instruction fetcher 92 to instruction decoder 94. Target generation logic 96 is preferably associated with the instruction decoder so that target addresses are generated as early as possible in the pipelines. Branch prediction unit 86 contains entries for branch instructions that are used to predict the outcome of branch, either predicted taken or predicted not taken, PT/PNT. Instruction fetcher 92 receives the prediction and continues fetching instructions from the predicted path.

Instruction decoder 94 dispatches instructions to pipelines 100, and loads valid bits into pipeline valid array 90. These valid bits preferably include the prediction from branch predict unit 86. The last stage of the pipelines is a write-back stage 98, which has a sequential address register 50 storing the address of the last instruction in the pipeline.

Branch resolver 60 receives the address of the last instruction in the pipeline from sequential address register 50, and the pipeline valid bits from pipeline valid array 90, and target addresses and other resources from pipelines 100. Branch resolver 60 determines if the branch was actually taken or not taken, AT/ANT, and generates a recovery address 75 and an update address 70. One embodiment for branch resolver 60 was shown in FIG. 7. The update address 70, which is the address of the branch instruction being resolved by branch resolver 60, is sent to branch prediction unit 86 and used to locate a prediction entry for the branch instruction being resolved so that the prediction can be updated. If the entry also includes a target address prediction, then the recovery address 75 may also be sent to the branch prediction unit 86 when the branch was actually taken (not shown).

A recovery address 75, either a target address or the sequential address of the instruction following the branch, is generated by branch resolver 60 while a branch is being resolved. Exception unit 84 may also generate a recovery address 75 when an instruction caused or had an exception. The recovery address 75 is sent to instruction fetcher 92 so that instructions starting with the recovery address mat be fetched from instruction cache 88 and decoded by instruction decoder 94.

A-stage sequential register 40 also receives the recovery address 75 when a mis-prediction has occurred. This register is loaded with the address of the instructions being decoded by instruction decoder 94. Since these instructions may be from a mis-prediction by branch prediction unit 86, A-stage sequential register 40 may hold an incorrect address. A-stage sequential register 40 may be used by instruction fetcher 92 or instruction decoder 94 as a program counter or instruction fetch register, and for building target addresses.

Branch resolver 60 is not contained in any one pipeline stage. It can resolve a branch in any stage after the decode stage when the target is generated. Muxes 72, 74, 78, 80, and 82 select inputs from either the A, C, M, or W stages, giving branch resolver 60 the flexibility to resolve a branch in any of these stages. Resolving branches early is an advantage because it allows the processor to recover from a mis-prediction sooner than if the branch was not resolved until the last pipeline stage.

ALTERNATE EMBODIMENTS

Several other embodiments are contemplated by the inventors. The W-stage sequential register could hold the address of the last instruction in the pipelines, or and address of the last instruction to complete the pipeline. This register could even hold an address related to one of these addresses, allowing the last instruction address to be calculated from the register value. Different encodings for the pipeline stage valid bits are also contemplated. Auxiliary encodings for compound instructions can be achieved in a variety of ways. The number and functions of the pipelines may also be varied. Two or more ALU, branch, or memory pipelines could be provided for, or two of the pipelines could be combined into one pipeline. Normally a single branch pipeline exists, but multiple branch pipelines would each have their own target registers, and one of the target registers would be selected as the base for the address tracking calculation. The concepts of length determination can easily be extended to groups of more than 3 instructions, and the invention has greater cost-savings when more than 3 pipelines share the same branch target and resolution logic. The invention is not intended to be limited to the two instruction sets described in the preferred embodiment, nor to only two instruction sets, but it is anticipated that the teachings disclosed herein will enable those of skill in the art to design processors for multiple instruction sets beyond the RISC and CISC instruction sets described herein.

Branch prediction may be implemented in many ways and may have various capabilities. The invention does not depend upon any particular type of branch prediction, and may be implemented without branch prediction, although the benefits from using branch prediction are significant. The invention does allow for taken branches to be dispatched together with their targets. An instruction stream discontinuity may therefore exist within a group of instructions in each stage in the pipelines. The branch may be one that switches to another instruction set, and the invention allows a group of instructions in a stage in the pipelines to have instructions from multiple instruction sets. Thus instructions from different instruction sets may be dispatched together and freely mixed in the pipelines.

The branch resolver has been described using a simple branch instruction that adds a displacement to the address of the branch instruction itself. Other types of branch instructions can use the apparatus with some modification or additional logic. For example, some branches use a value in a register as the target address, rather than use the displacement to generate the target address. These register-based branches can still be resolved, but their target is not available until the register has been written by prior instructions.

The adders and logic to generate the addresses, such as the update address and the target address, may be implemented in many ways, and the invention is not limited to the embodiment shown for illustrating one way to implement the invention. The address widths do not have to be the full address width, as a partial width may suffice in some cases. For example, the branch prediction unit may need only an index portion of the branch address to locate the entry for the branch instruction resolved and to be updated. This index portion may be a small part of the full address width.

The pipeline valid array may be updated with the correct lengths and valid bits as soon as a branch is resolved. This can simplify the adjustment logic for the exit register by effectively breaking the recovery calculation up.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A processor for executing instructions, the processor comprising:

a plurality of pipelines including a pipeline for executing a branch instruction, the pipeline including
target means for generating a target address for the branch instruction;
staging means, coupled to the target means and receiving the target address, for staging the target address through the pipeline;

exit register means, coupled to the staging means and receiving the target address when the branch instruction is a taken branch, for storing an exit address of a next instruction in a last stage of the pipeline to complete execution by the processor, the exit address being updated with the target address when the branch instruction is a taken branch;

incrementing means, coupled to the exit register means and receiving the exit address, for incrementing the exit address by an exit adjustment value, the exit adjustment value being a sum of instruction lengths of a group of instructions completing processing by the processor since the exit register means was last updated; and updating means, coupled to the incrementing means, for updating the exit address with a sum of the exit address and the exit adjustment value, the updating means updating the exit address when the branch instruction is not a taken branch, or when the group of instructions completing processing is absent any branch instruction, the updating means updating the exit address with the target address when the branch instruction is a taken branch completing processing by the processor;

address tracking means, coupled to the exit register means and coupled to the staging means, for generating a desired address of a desired instruction in the plurality of pipelines, the address tracking means receiving the exit address from the exit register means and receiving the target address from the staging means; and valid bits, coupled to the staging means, for indicating stages within the pipeline having valid instructions and for indicating execution order of valid instructions in the plurality of pipelines, wherein the valid bits indicate locations and outcomes of intervening branch instruction in the plurality of pipelines;

wherein the address tracking means comprises:
search means, coupled to the valid bits, for determining if an intervening taken branch instruction is present in the plurality of pipelines after the desired instruction in the pipeline but before the next instruction to complete processing by the processor;

base select means, coupled to the search means, for selecting a base address from the staging means, the base address being a target address for the intervening taken branch instruction if the search means determines the intervening taken branch instruction is present, but the base select means selecting as the base address the exit address if the search means determines the intervening taken branch instruction is not present;

adjust means, receiving the valid bits and coupled to the search means, for generating an adjustment from the valid bits, the adjustment being a total of a first plurality of instruction lengths for instructions in the plurality of pipelines between the desired instruction in the pipeline and the intervening taken branch instruction if the intervening taken branch instruction is determined to be present, but the adjustment being a total of a second plurality of instruction lengths for instructions in the plurality of pipelines between the desired instruction in the pipeline and the next instruction to complete processing by the processor if the intervening taken branch instruction is determined not to be present; and adder means, coupled to the base select means, for adding the adjustment from the adjust means to the base address from the base select means to generate an address of the desired instruction in the pipeline, wherein the exit address is an address of the next instruction to complete processing by the processor, and wherein the address of the desired instruction in the pipeline is generated.

2. The processor of claim 1 wherein the second plurality of instruction lengths for instructions in the plurality of pipelines between the desired instruction in the pipeline and the next instruction to complete processing by the processor includes an instruction length of the next instruction to complete processing by the processor.

3. The processor of claim 1 wherein the desired instruction in the pipeline is an instruction causing an exception, the desired address of the desired instruction in the plurality of pipelines being an address of the desired instruction in the pipeline.

4. The processor of claim 1 wherein the desired instruction in the pipeline is an instruction following a second branch instruction, the desired address being a target recovery address when the second branch instruction is taken, the desired address being a sequential recovery address when the second branch instruction is not taken.

5. The processor of claim 1 wherein the valid bits include a taken/not taken bit for each stage to indicate if a taken branch instruction is valid for that stage.

6. The processor of claim 1 wherein the desired instruction in the pipeline is a second branch instruction, the desired address being an update address sent to a branch prediction unit to update a prediction entry for the second branch instruction.

7. The processor of claim 6 further comprising a second address tracking means, coupled to the staging means, for outputting an address of a following sequential instruction following the second branch instruction;

recovery address multiplexing means, coupled to the staging means, for outputting a recovery address when a mis-prediction is signaled, the recovery address being the address of the following sequential instruction when the second branch instruction has an actual outcome of not taken, the recovery address being a second target address for the second branch instruction when the second branch instruction has an actual outcome of taken; and a branch resolver, coupled to the recovery address multiplexing means, for determining if the second branch instruction has the actual outcome of taken or not taken, the branch resolver comparing the actual outcome to a predicted outcome and signaling the mis-prediction if the actual outcome does not match the predicted outcome, wherein the recovery address is generated.

8. The processor of claim 7 wherein the recovery address is sent to an instruction fetch unit.

9. The processor of claim 8 further comprising second multiplexing means, coupled to the staging means, for outputting the second target address for the second branch instruction, the second multiplexing means receiving from the staging means a plurality of target addresses from a plurality of pipeline stages, the second multiplexing means selecting as the second target address a selected target address in the plurality of target addresses, the selected target address from a pipeline stage containing the second branch instruction, wherein the second branch instruction may be resolved in one of a plurality of pipeline stages.

10. The processor of claim 9 wherein the valid bits include a taken/not taken bit for each stage to indicate if a taken branch instruction is valid for that stage.

* * * * *